(No Model.)  8 Sheets—Sheet 1.

L. EHRLICH.
CASH REGISTER, INDICATOR, AND CHECK PRINTER.

No. 509,657.  Patented Nov. 28, 1893.

Fig. 1.

Witnesses.
S. W. Brainard,
R. B. Caffray.

Inventor
Leo Ehrlich
by Edward Rector
his atty.

(No Model.)
L. EHRLICH.
CASH REGISTER, INDICATOR, AND CHECK PRINTER.
No. 509,657. Patented Nov. 28, 1893.

Witnesses.
S. W. Brainard,
R. B. Caffray

Inventor.
Leo Ehrlich
by Edward Rector
his atty.

(No Model.) 8 Sheets—Sheet 5.

L. EHRLICH.
CASH REGISTER, INDICATOR, AND CHECK PRINTER.

No. 509,657. Patented Nov. 28, 1893.

Witnesses.
S. H. Brainard,
R. B. Baffray.

Inventor.
Leo Ehrlich
by Edward Rector
his atty.

(No Model.) 8 Sheets—Sheet 6.
L. EHRLICH.
CASH REGISTER, INDICATOR, AND CHECK PRINTER.

No. 509,657. Patented Nov. 28, 1893.

(No Model.) 8 Sheets—Sheet 7.
L. EHRLICH.
CASH REGISTER, INDICATOR, AND CHECK PRINTER.

No. 509,657. Patented Nov. 28, 1893.

Witnesses.
S. W. Brainard.
R. B. Caffray.

Inventor.
Leo Ehrlich
by Edward Rector
his atty

THE NATIONAL LITHOGRAPHING COMPANY,
WASHINGTON, D. C.

(No Model.) 8 Sheets—Sheet 8.
L. EHRLICH.
CASH REGISTER, INDICATOR, AND CHECK PRINTER.
No. 509,657. Patented Nov. 28, 1893.

Witnesses.
S. N. Brainard.
R. B. Caffray.

Inventor:
Leo Ehrlich
by Edward Rector
his atty.

UNITED STATES PATENT OFFICE.

LEO EHRLICH, OF ST. LOUIS, MISSOURI, ASSIGNOR TO THE NATIONAL CASH REGISTER COMPANY, OF DAYTON, OHIO.

CASH REGISTER, INDICATOR, AND CHECK-PRINTER.

SPECIFICATION forming part of Letters Patent No. 509,657, dated November 28, 1893.

Application filed August 28, 1893. Serial No. 484,199. (No model.)

*To all whom it may concern:*

Be it known that I, LEO EHRLICH, a citizen of the United States, residing at St. Louis, in the State of Missouri, have invented a certain new and useful Improvement in Cash Registers, Indicators, and Printers, of which the following is a description, reference being had to the accompanying drawings, forming part of this specification.

My present machine in its general features and mode of operation resembles that shown and described in my pending application, Serial No. 409,633, filed October 23, 1891, and its novelty consists in certain modifications in the construction and arrangement and specific modes of operation of the parts, which will be hereinafter described and particularly pointed out in the claims.

In the accompanying drawings

The same letters of reference are used to indicate identical parts in all the figures.

My present machine, like the one shown in my aforesaid application, employs a single operating handle or lever A pivoted between ears B carried by the front end of a horizontal rock-shaft C journaled in a tubular bearing D suitably supported by the framework, Figs. 3, 4, 5 and 7. This shaft projects through the front of the casing and carries a pointer E which co-operates with a numbered dial F upon the front of the casing, Fig. 1. At its rear end the shaft C has fast upon it a beveled gear G which meshes with a beveled pinion H fast upon the lower end of a vertical indicator shaft I mounted in suitable bearings in the framework. Feathered upon the upper end of this shaft, or otherwise mounted upon it so as to slide vertically but turn with it, is a sleeve or hub J, which carries the indicator K, said indicator consisting of a cylindrical band or wheel bearing a series of indicating numbers corresponding to those upon the dial upon the front of the casing.

Figure 1:
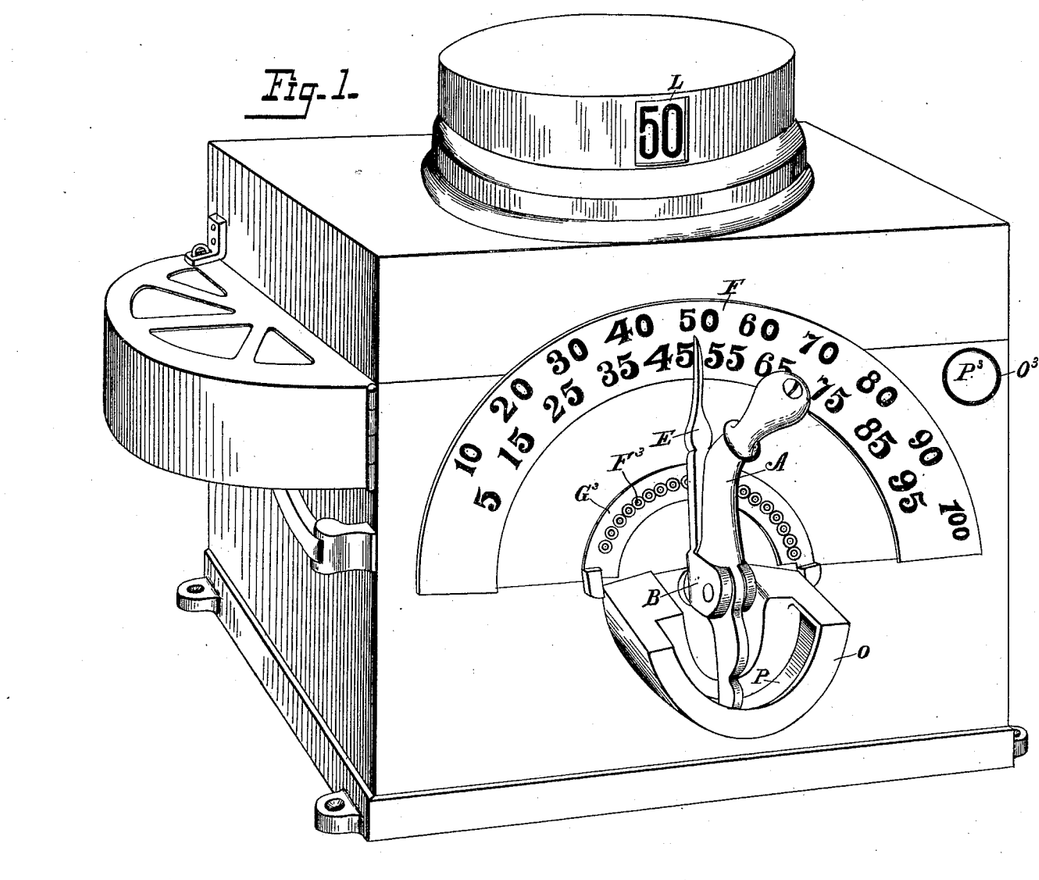
Figure 1 is a front perspective view of the machine within its case, and with the operating handle and indicator in position to indicate and register 50.

From the foregoing description it will be understood that when the operating handle A, Fig. 1, is swung from side to side and the shaft C thereby rocked, the indicator K will be turned with it, and the adjustment of the parts is such that when the handle A is turned until the pointer E is brought opposite a given number upon the dial the indicator K will be turned until its corresponding number is brought into vertical line with the sight opening L in the cylindrical upper portion of the casing which incloses the indicator. When the indicator is in its lowermost position upon the vertical shaft I it stands below the horizontal plane of the lower edge of the sight opening L, so that when it is turned until a given number is brought into vertical line with such sight opening such number is not exposed to view until the indicator is lifted to the horizontal plane of such opening. Such lifting of the indicator to indicating position is accomplished by the movement of the operating handle A upon its pivotal axis in the ears B, after it has been turned until the pointer E is brought opposite the desired number upon the dial. Such movement of the operating handle upon its fulcrum or axis operates to lift the indicator through the medium of a backwardly and forwardly reciprocating frame or carriage M mounted to slide backward and forward upon horizontal guide bars N, Figs. 2 to 7. This reciprocating frame or carriage is provided at its front end with a segmental extension O which projects through the front plate of the casing and has formed in it a semi-circular housing P within which fits the lower end of the operating lever A. As the upper end of said lever is swung from side to side to move the pointer E over the dial its lower end travels freely in the housing P, but when the lever is rocked upon its fulcrum in the ears B its lower end will reciprocate the frame M, moving it rearward as the upper end of the lever is thrown outward and downward, and moving it forward when the lever is returned to normal position.

The lower end of the sleeve or hub J of the indicator, Figs. 2 to 5, has fast upon it a collar Q provided with a circumferential groove in which fit pins R carried by the opposite ends of a curved yoke-piece S. The pins R project through and are guided vertically by slots T in fixed vertical plates U carried by the framework. It results from this that while the hub J and indicator are free to turn upon the vertical shaft I they will move vertically thereon with the yoke-piece S and pins R. One of the pins R projects some distance beyond its guide plate U into the path of the cam plate V carried by the reciprocating frame M, Figs. 3 to 6. It results from this that whenever the frame M is slid rearward the cam plate V will ride under the pin R and lift the indicator, the pin R preferably being provided with an antifriction collar W to lessen the friction between it and the plate V.

Figure 3:
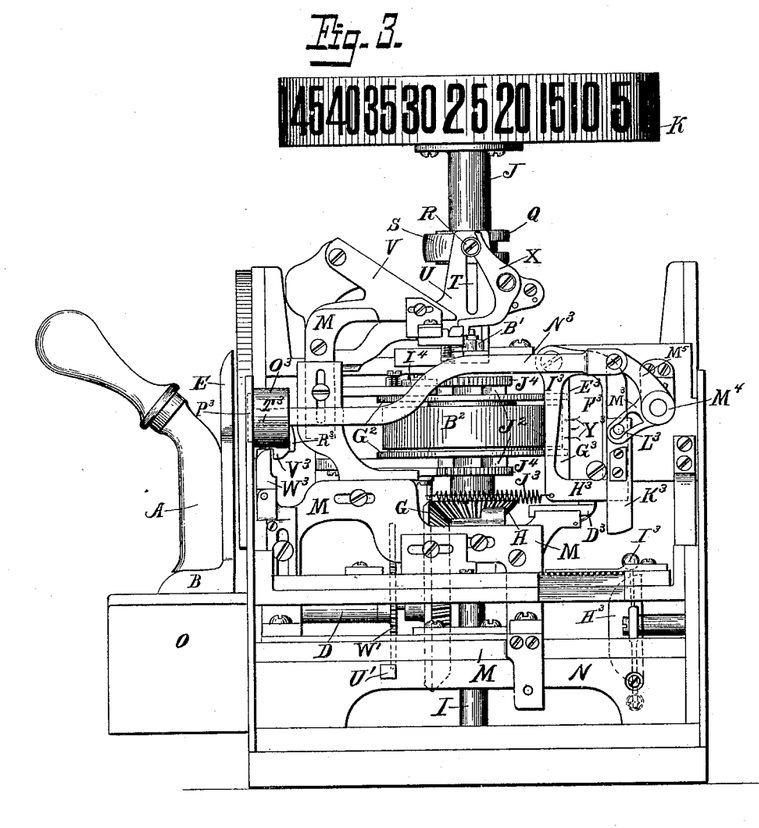
Fig. 3 a corresponding view of the right hand side.

For the purpose of temporarily holding the indicator in elevated position there is provided a spring-pressed latch-plate X, Figs. 3 to 6 and 9, having near its upper end a shoulder adapted to catch under the pin R when the latter is lifted above it, and thereby support the indicator as shown in Fig. 3.

Figure 8:
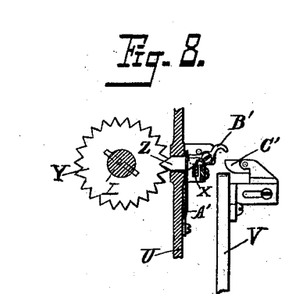
Fig. 8 a horizontal sectional detail of the devices for tripping the indicator-supporting latch.
Figure 9:
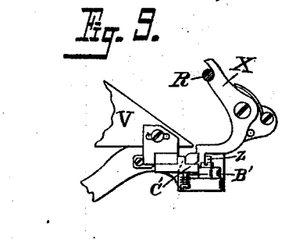
Fig. 9 a detail side elevation of the same.

For the purpose of releasing the indicator and permitting it to drop out of sight there is provided means for tripping the latch X and disengaging its shoulder from the pin R. To this end the vertical indicator shaft I has fast upon it a toothed wheel Y with which co-operates a sliding block Z fitted in a guide way in one of the plates U and provided on its outer end with a beveled or cam surface adapted to bear against the lower end of the latch plate X, Figs. 4, 5 and 8. A spring A' engaging the block Z presses its inner end against the wheel Y, and when it fits in one of the notches in said wheel its opposite beveled end permits the latch X to be held in operative position by its spring, but when the wheel Y is turned and the block Z forced out of the notch in which it has been resting the beveled surface of the block will bear against the lower end of the latch-plate X and move it forward and throw its upper end rearward to disengage its shoulder from the pin R and release the indicator. In this manner at the first lateral movement of the operating handle from the position in which it has been left at the last operation of the machine the indicator will be released and drop out of view.

As an additional means for releasing the indicator, and to provide for the release of it at each operation of the machine whether it be turned upon its vertical axis or not, there is provided a trip lever B' pivoted to the framework adjacent the lower end of the latch plate X, Figs. 3 to 9, and adapted to be engaged by a trigger C' upon the carriage M. At the first rearward movement of such carriage the trigger will engage the outer end of the lever B' and force it rearward as it passes, thereby throwing the inner end of said lever forward against the lower end of the latch plate X and moving the latter to disengage its supporting shoulder from the pin R. At the return forward movement of the carriage M the trigger C' will yield and slip idly over the trip lever B', the latter being held from movement in this direction by a suitable stop. In this manner the indicator will be released and dropped out of view at the first rearward movement of the carriage M, even though the sale to be indicated and registered is the same as the immediately preceding one, so that the indicator has not been turned upon its axis at all.

Figure 4:
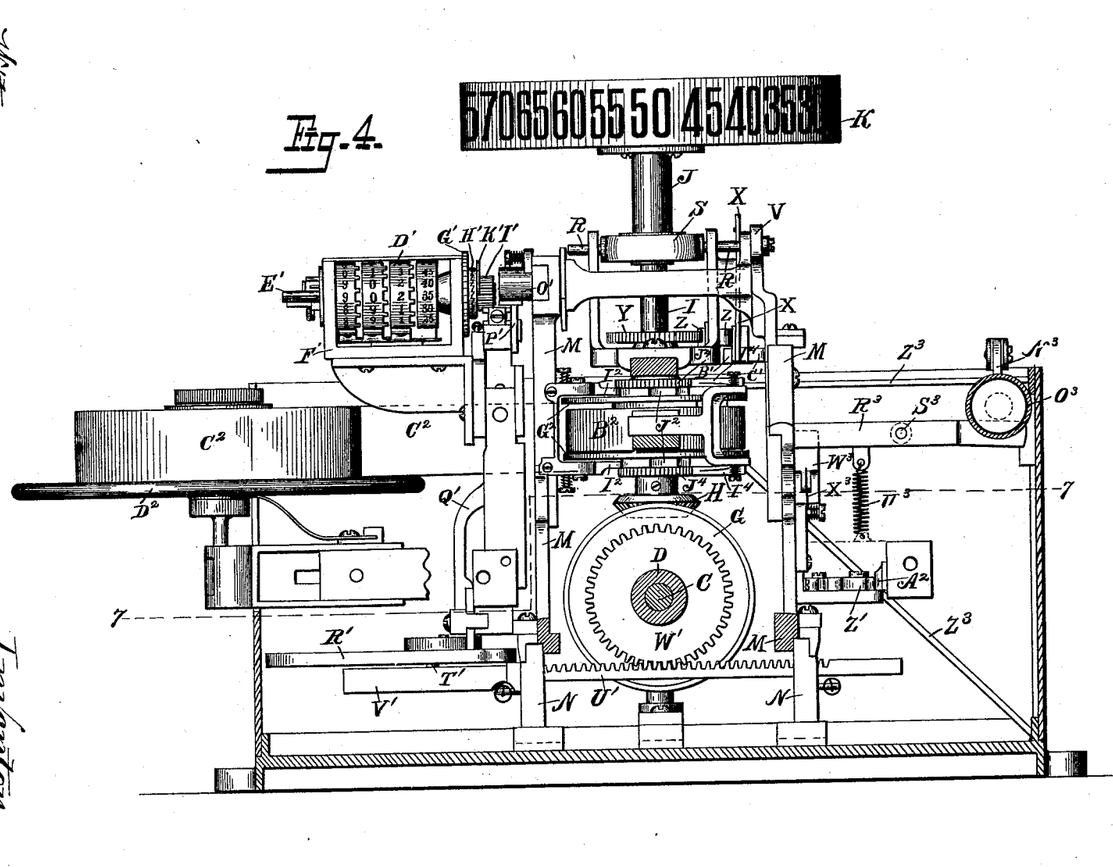
Fig. 4 a vertical section just within the front plate of the casing, showing most of the parts in elevation.

The registering mechanism of the machine may be described as follows: The registering wheels D', Figs. 3 and 4, are loosely mounted upon a shaft E' supported in the framework F'. The right hand or primary registering wheel is provided with a hub or sleeve which projects to the right through the right hand plate of the frame F', and has fast upon it a ratchet wheel G' and one member of a clutch H'. The second member of the clutch is secured to or formed integral with a pinion I' loose upon the extreme right hand end of the shaft E' and meshing with a reciprocating rack J', Fig. 6. A flat spring K' bearing against the clutch member carried by the pinion yieldingly holds the two members of the clutch in engagement with each other, but permits the one carried by the pinion to slip backward over the other, a pawl L' engaging the ratchet G' holding the latter and the primary wheel from backward movement with the clutch member. A coiled spring M', Fig. 6, connected at its rear end to the rack-bar J' and at its front end to the framework yieldingly holds the rack-bar in its normal forward position against an adjusting screw N'. The rack-bar J' is actuated by a pawl O' carried by the reciprocating frame or carriage M. The frame M, as before explained, has a definite backward and forward movement at each operation of the machine, but the extent of movement which the pawl O' imparts to the rack-bar J' is controlled by an adjustable guard plate P' located immediately adjacent the right hand side of the rack-bar and underlying the pawl O'. This adjustable guard plate is carried by the upper end of the vertical arm Q' of a backwardly and forwardly reciprocating frame R' mounted upon suitable guide ways on the framework, Figs. 2, 4, 5 and 7. The lower horizontal plate of the reciprocating frame R' is provided with a diagonal slot S', Fig. 7, in which fits and travels a pin T' upon the upper side of the left hand end of a horizontal rack-bar U', Fig. 4, which is passed through and guided in openings in the bars N before described and has its left hand end confined in a guide way V' supported by the left hand one of said bars. The rack-bar U' meshes with a gear wheel W' fast upon the shaft C which carries the operating handle A, so that when the handle is swung from side to side and the pointer moved over the dial the rack-bar U' will be reciprocated laterally in one direction or the other, and, by its connection with the frame R' through the pin T' and diagonal slot S', will reciprocate said frame backward or forward according to the direction of movement of the handle. The adjustment of the parts is such that when the operating handle is turned until the pointer E stands opposite a given number upon the dial the guard-plate P' will be moved into position to permit the pawl O', in its rearward movement, to engage the rack-bar J' at the proper point to cause it to move such rack-bar the exact distance necessary to register upon the primary wheel D' the number indicated by the pointer upon the dial. It will be understood that the upper edge of the forward portion of the guard-plate P' projects above the plane of the rack-bar J', so as to hold the pawl O' out of engagement with the rack-bar. The guard-plate is provided with an off-set at X', and the portion of it in rear of such off-set lies below the plane of the rack-bar, so that when the pawl O' in its rearward movement passes beyond this point it engages the rack-bar and turns the registering wheel.

As in the machine shown in my prior application the primary registering wheel D is provided with a naught and nineteen numbers representing multiples of five from 5 to 95 inclusive, and each of the succeeding registering wheels is provided with duplicate series of numbers representing the nine digits and a naught. At each complete revolution of any one of the wheels the amount registered by it is transferred to the next higher wheel in the series by means of the transfer pinions Y', as described in my aforesaid application.

Figure 6:
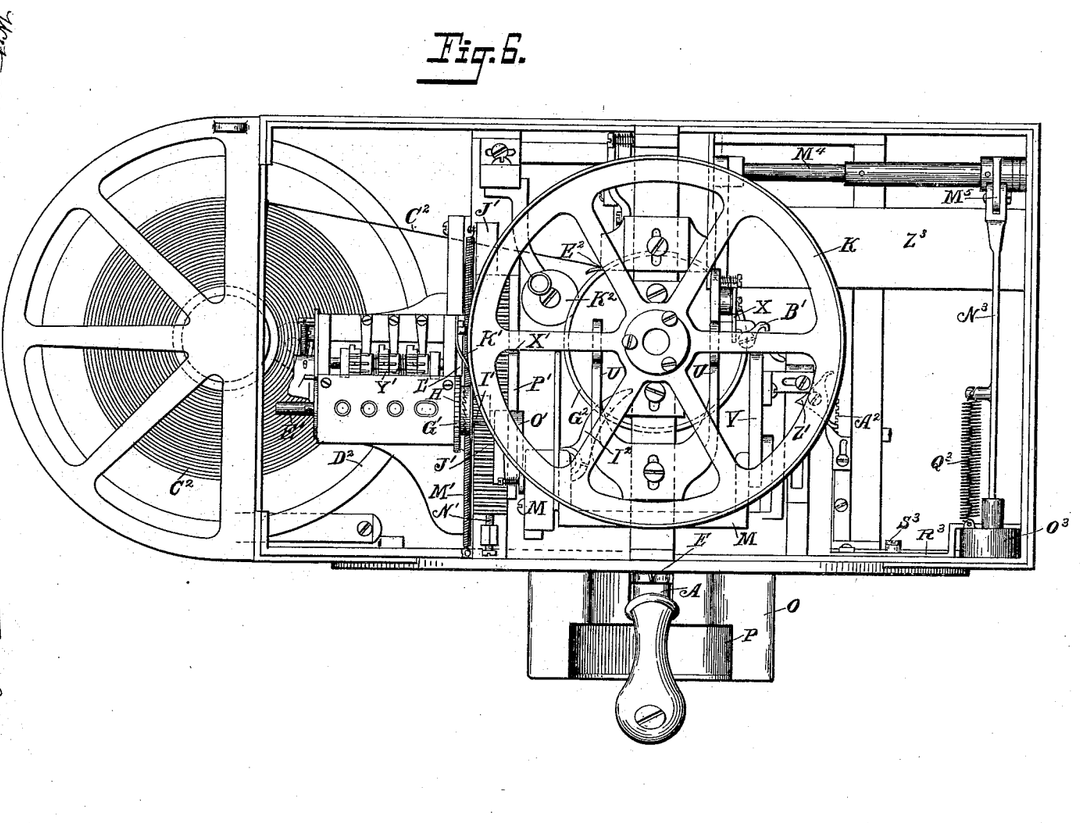
Fig. 6 a top plan view.
Figure 7:
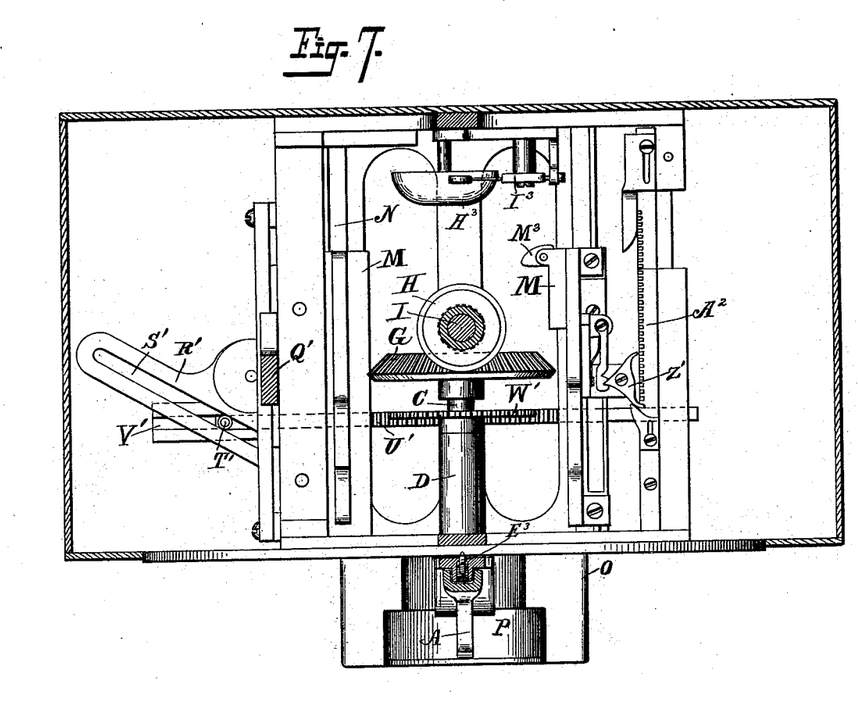
Fig. 7 a horizontal section approximately on the lines 7—7 of Figs. 4 and 5.

For the purpose of insuring a full backward and forward movement of the reciprocating frame M' at each operation of the machine there is provided the double-toothed pawl Z', Figs. 6 and 7, carried by said frame and co-operating with a fixed rack $A^2$ upon the framework, in the usual manner.

Having now described the indicating and registering mechanisms of the machine, the printing mechanism, by which the amounts indicated and registered are printed upon a paper strip, may next be described, as follows: The vertical indicator shaft I has fast upon it a short distance above its lower end a type-wheel $B^2$, Figs. 3 and 4, bearing a series of type-numbers corresponding to the indicating numbers upon the indicator K and the index numbers upon the dial F. The type-wheel $B^2$, is secured upon the shaft I in such position that when the operating handle is turned until the pointer E stands opposite a given number upon the dial and the corresponding number upon the indicator K is in line with the sight opening, the same number upon the type-wheel $B^2$ will be brought to the printing point. In the present instance the printing point is directly in rear of the vertical shaft I, so that the indicator K and type-wheel are arranged in exactly reverse position, their corresponding numbers standing upon diametrically opposite sides of their common vertical axis. The supply of paper strip $C^2$ is carried upon a reel $D^2$, Figs. 4, 5 and 6, whence it is led to the right through a guide-way at $E^2$, Figs. 2 and 6, and across the rear side of the type-wheel $B^2$, between the latter and the impression platen hereinafter described.

The means for feeding the paper strip past the printing point consists of two disks $G^2$ loose upon the shaft I, one immediately above and the other immediately below the type-wheel $B^2$, and a co-operating pair of smaller disks $H^2$, Figs. 10 and 11, mounted upon vertical axes immediately in rear of the disks $G^2$ and in the same horizontal planes, with their edges bearing against the edges of the disks $G^2$. The edges of these feeding disks are milled or roughened to enable them to grasp the paper strip which is led between them. The disks $G^2$ are turned to advance the strip at each operation of the machine by means of spring-pressed pawls $I^2$, Figs. 4 and 6, carried by the reciprocating frame M and co-operating with ratchets $J^2$ fast upon the disks $G^2$. When the frame M is in its normal forward position these pawls $I^2$ stand some distance away from the ratchets $J^2$, Fig. 6, so that they do not engage the ratchets and turn the disks $G^2$ to advance the paper strip until the frame M has completed a portion of its rearward movement, thus allowing time for the printing of the number upon the paper strip to be effected before the strip is advanced from the printing point. Spring-pressed pawls $I^4$ mounted upon a fixed portion of the framework and co-operating with ratchets $J^4$ also fast upon the disks $J^2$, prevent backward movement of said disks when the frame M is slid forward to normal position and the pawls $J^2$ drawn backward over the ratchets $J^2$. The type-wheel $B^2$ is surrounded by an inking ribbon or band to which ink is supplied from an inking roller $K^2$ which bears against it. This roller, as in the machine covered by my prior application, consists of a hollow perforated cylinder mounted upon a vertical axis and having its sides covered with felt or other absorbent material by which the supply of ink within the cylinder is distributed over the inking ribbon upon the type-wheel.

Figure 2:
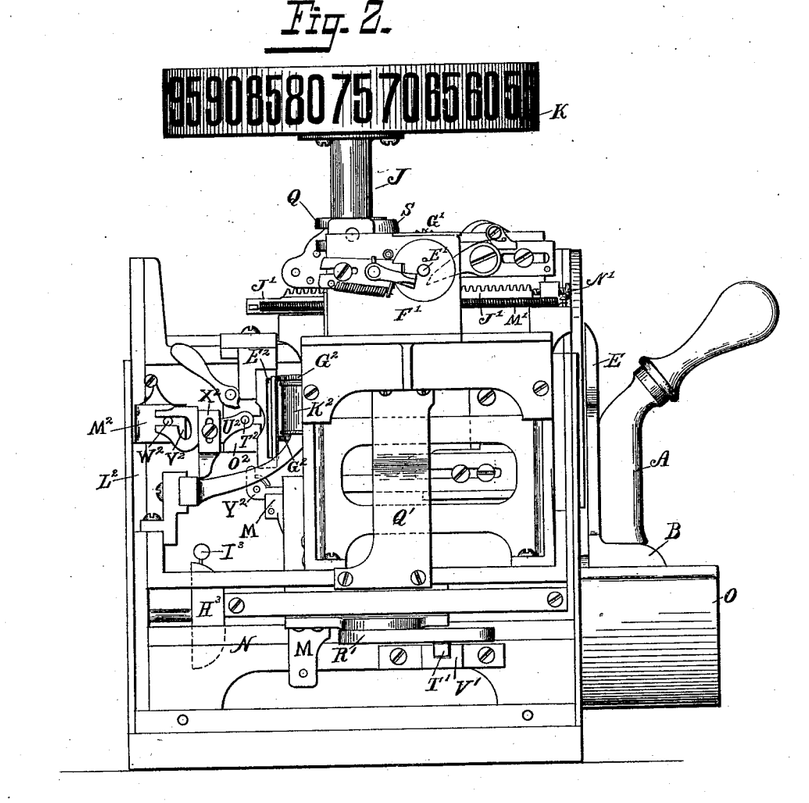
Fig. 2 an elevation of the left hand side of the machine.
Figure 5:
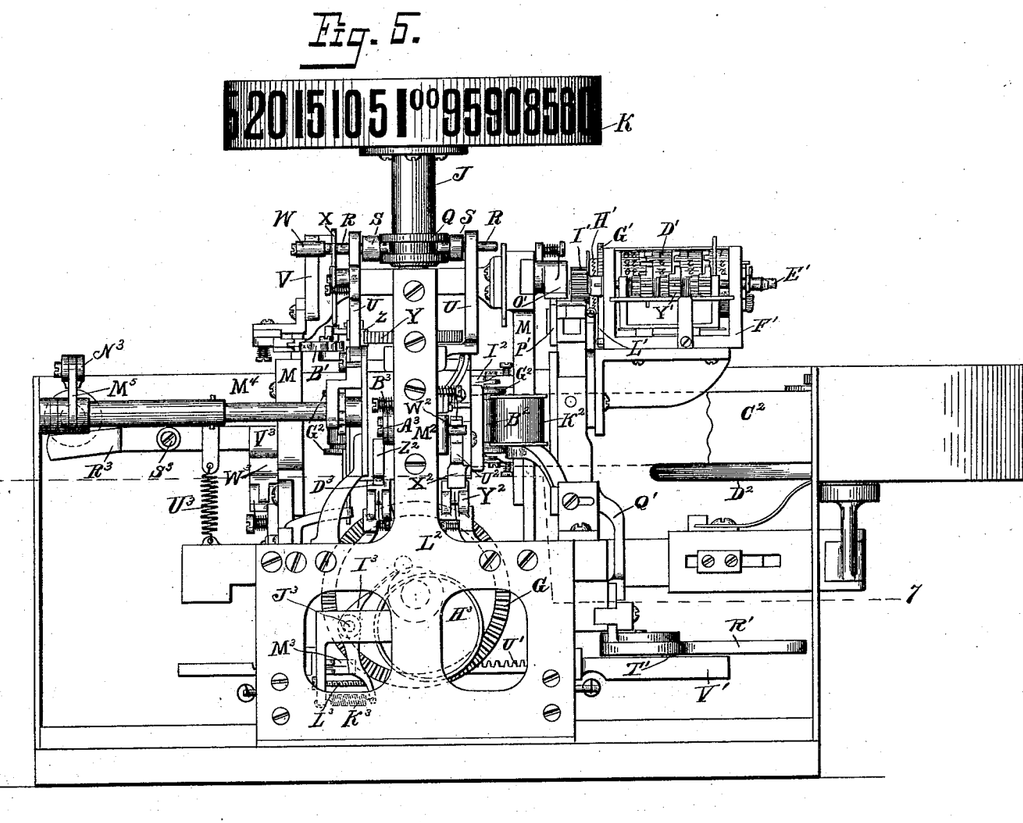
Fig. 5 a rear elevation of the machine.
Figures 10, 11:
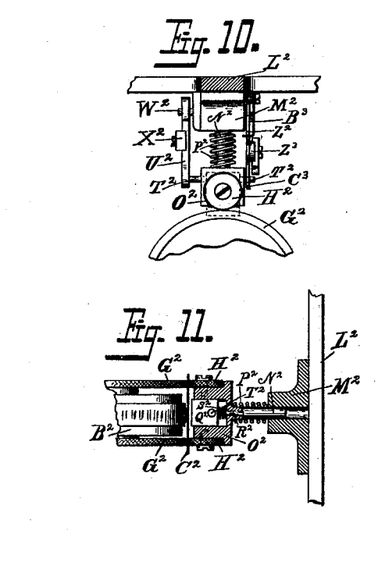
Fig. 10 a detail plan view of the printing devices co-operating with the type-wheel.
Fig. 11 a detail vertical section of the same, and Fig. 12 a detail side elevation thereof.

Secured to the back-plate $L^2$ of the framework, Figs. 5, 6 and 10 to 12, is a block $M^2$. This block is provided with a cylindrical bore in which fits a rod $N^2$ which carries upon its front end a housing $O^2$. This housing has journaled upon it the two feeding disks $H^2$ which co-operate with the disks $G^2$, as before explained, and a coiled spring $P^2$ surrounding the rod $N^2$ between the block $M^2$ and housing $O^2$ presses the latter forward and yieldingly holds the disks $H^2$ against the disks $G^2$. The platen $Q^2$ which co-operates with the type-wheel $B^2$ is confined in the housing $O^2$. It is carried upon the front end of a rod $R^2$, Fig. 11, which extends back into a recess or bore in the rod $N^2$ and has coiled around it a spring $S^2$ which tends to throw the platen against the type-wheel $B^2$. The platen has projecting laterally from its opposite sides pins $T^2$ which extend through horizontal slots in the sides of the housing $O^2$. The left hand one of these pins $T^2$ has hung upon it an arm $U^2$, Figs. 2, 5 and 10, provided near its rear end with a recess $V^2$ embracing a pin $W^2$ upon the side of the block $M^2$, Fig. 2. This arm $U^2$ has fast upon it a pendent plate $X^2$ having a rounded lower end adapted to be engaged by a pivoted piece $Y^2$ mounted upon the frame M. When the frame M is moved rearward the part $Y^2$ will bear against the lower end of $X^2$ and force the arm $U^2$ rearward, thereby retracting the platen against the pressure of its spring $S^2$, until the horizontal portion of the recess $V^2$ in the arm $U^2$ clears the pin $W^2$, whereupon the depending portion of the recess $V^2$ will permit the rear end of the arm $U^2$ to be thrown upward by the further rearward movement of the frame M and allow the part $Y^2$ to clear the lower end of the plate $X^2$. When the platen has thus been retracted it is caught and held by a latch which engages the pin $T^2$ upon the opposite side of the housing $O^2$ from that shown in Fig. 2, as presently explained, and during the return forward movement of the frame M the part $Y^2$, when it engages the lower end of the plate $X^2$, will tilt and slip under said plate without moving the arm $U^2$.

Figure 12:
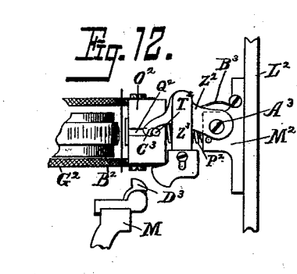

The latch $Z^2$ for holding the platen in its retracted position is shown in Fig. 12, where it will be seen that it consists of a plate pivoted to the block $M^2$ at $A^3$, pressed downward by a spring $B^3$, and provided with a hook $C^3$ adapted to catch over the pin $T^2$ upon the platen when the latter is moved rearward in the manner before described.

The latch plate $Z^2$ has fast upon and depending from it a plate $Z^3$ provided upon its lower end with a rounded cam or bearing surface adapted to be engaged by a pivoted trip $D^3$ mounted upon the frame M. This trip engages the lower end of the latch plate at the beginning of the rearward movement of the frame M, and lifts the latch plate and releases the platen and permits its spring $S^2$ to throw it against the type-wheel to effect the printing, before the part $Y^2$ heretofore described comes in contact with the plate $X^2$ of the resetting arm $U^2$ to retract the platen. Thus at each rearward movement of the frame M the platen is first released and thrown forward by a spring, to effect the printing, and is then retracted and caught and held by the latch, ready for the next operation. At the forward movement of the frame the trip $D^3$ yields as it strikes the lower end of the plate $Z^3$ and slips under it and resumes its normal position.

From the foregoing description it will be understood that the latch is released and the printing effected before the feeding disks $G^2$ $H^2$ are turned to advance the paper strip, and that these disks are turned for that purpose after the printing has been done and while the platen is being reset for the next operation.

The paper strip is employed in the present machine as a check-strip, and at each operation of the machine the end of the strip bearing the printed number is severed from the strip to form a detached check. The means for cutting the strip into checks is shown in Fig. 3. As the strip is delivered from the printing point it passes through a narrow slot $E^3$ between the shearing plate $F^3$ and a second plate $G^3$ in front of the plate $F^3$. Pivoted to the plate $G^3$ at its upper end is a swinging frame $H^3$ whose front vertical bar $I^3$ constitutes a knife or shearing edge co-operating with the plate $F^3$. A spring $J^3$ connected to the lower forward corner of the frame $H^3$ yieldingly holds it in its normal forward position. Mounted upon the rear portion of the frame $H^3$ is a vertically sliding plate $K^3$ whose lower end normally depends below the plate $H^3$ into the path of travel of a part of the frame M, and the adjustment of the parts is such that just as the frame M completes its rearward movement the frame $H^3$ will be swung rearward and the printed check sheared off against the plate $F^3$.

For the purpose of printing two or more amounts upon a single check, where the amount of the sale exceeds the highest amount that can be indicated and registered at a single operation of the machine, I have provided means for temporarily throwing the cutting mechanism out of action, so that when one amount has been indicated and registered, and printed upon the strip, the latter will be advanced so that a second amount can be printed upon it before the printed check is severed from it. In the present instance the cutting mechanism is thrown out of action by lifting the vertically sliding plate $K^3$ out of the path of travel of the frame M and temporarily holding it in elevated position. To that end the upper end of said plate is provided with a laterally projecting pin $L^3$ which fits in a slot in an arm $M^3$ fast upon a rock-shaft $M^4$ which rock-shaft has fast upon its right hand end an arm $M^5$ to whose upper end is pivoted the rear end of an arm or link $N^3$ whose front end passes through and is guided in a cylindrical housing $O^3$ upon the front plate of the casing, and has upon its extreme front end a push button $P^3$, Fig. 1, adapted to be pressed into the housing $O^3$. When the button $P^3$ is pressed in the shaft $M^4$ will be rocked and the plate $K^3$ lifted. A coiled spring $Q^3$ connected at its front end to the housing $O^3$ and at its rear end to the link N³ yieldingly holds the parts in their normal position with the plate K³ in the path of the frame M.

For the purpose of temporarily holding the parts in their abnormal position, when the button P³ is pressed in and the plate K³ lifted, there is provided a bent detent lever R³, Figs. 4, 5 and 6, pivoted to the front plate of the casing at S³ and having its right hand end bent rearward around the housing O³ and adapted to co-operate at its upper edge with a notch T³ in the under side of the link N³. A coiled spring U³ connected to the lever R³ at the left of its fulcrum, Figs. 4 and 5, pulls its left hand end downward and throws its right hand end upward ready to enter the notch T³ in the link N³ when the latter is pressed rearward.

For the purpose of disengaging the detent lever R³ from the link N³ at the end of the operation of the machine, to throw the cutting mechanism into position for action at the next succeeding operation, the left hand end of the lever is provided with a pendent cam surface V³ adapted to co-operate with a trip W³ pivoted upon the frame M. This trip is free to swing forward, but cannot swing backward, and the result is that at the rearward movement of the frame M the trip yields and slips under the pendent portion V³ of the lever, without moving the latter, but at its return forward movement it lifts the left hand end of the lever and throws its right hand end downward, disengaging it from the notch T³ in the link N³ and permitting the spring Q³ to restore the parts to normal position and lower the plate K³ into the path of the frame M. The trip W³ is yieldingly held in and returned to normal position by a spring X³, Fig. 4.

From the foregoing description it will be understood that when it is desired to print two numbers upon a single check it is simply necessary to press in the button P³ and then operate the machine twice, to successively indicate, register and print the desired numbers. At the first operation of the machine the cutting mechanism will be out of operative position, so that the check will not be severed from the strip, but it will be thrown into operative position at the end of such first operation, and at the end of the second operation the double length check, with the two numbers printed upon it, will be severed from the strip. If it be desired to print more than two numbers upon a single check the button P³ may be pressed inward and held during as many operations of the machine as desired. For the purpose of preventing such double or multiple checks being cut in two without detection the plates F³ J³ of the cutting mechanism are in the present instance provided with projections Y³ and co-incident notches, so that the checks will be severed from the strip upon irregular lines. This will cause each check issued, whether a single or multiple check, to have several notches in one end of it and corresponding projections upon its opposite end, and if a party to whom such a check had been issued should cut it in two and present only part of it to the cashier in paying his bill he would be detected, unless he had severed the check upon a line so closely resembling that made by the machine as not to be noticed, and this would be difficult for him to do. When the printed checks are cut from the strip they fall upon an inclined guide-way Z³, Fig. 4, and slide down the same to an opening in the side plate of the casing.

For the purpose of exactly adjusting the operating handle to its different indicating and registering positions the pointer E is provided about midway of its length with an interior recess or housing in which is confined a spring plunger E³, Fig. 7, adapted to co-operate with a series of holes or recesses F³ in a semi-circular plate G³ upon the front side of the casing, Fig. 1. The positions of the holes F³ are such that whenever the plunger E³ of the pointer is engaged with one of the holes the pointer itself will be exactly opposite some number upon the dial F and the operating handle consequently in proper position to indicate and register such number, and the spring permits the pointer to yield and slip from one recess to another as the handle is moved from side to side.

The machine is also provided with a gong H³, Figs. 2, 3, 5 and 7, which is sounded by a striker I³ at each operation of the machine. The striker I³ consists of a lever pivoted to the frame-work at J³, Fig. 5, and having connected to its lower end a coiled spring K³ which tends to throw it toward the gong, its movement in that direction being limited by a set screw L³ against which the lower end of the striker is normally held by the spring. At each operation of the machine and rearward movement of the frame M a trigger M³ carried by the frame will engage the lower end of the lever I³ and force its upper end away from the gong as it passes by the lever, and when it clears the lever the spring K³ will throw the latter quickly back to normal position and its momentum will cause its upper end to strike and sound the gong. The trigger M³ is yieldingly held in normal position by a spring, and at the return forward movement of the frame M it rides over the lever I³ without moving the latter and then resumes its normal position.

Having thus fully described my invention, I claim—

1. The combination of the vertical indicator shaft I, the vertically sliding indicator K mounted thereon and provided with the hub J having the grooved collar Q, the yoke-piece S provided with the pins R projecting through the vertical slots T in the guide plates U and fitting also in the groove in the collar Q, the latch X co-operating with one of the pins R, the toothed wheel Y fast upon the shaft I, the sliding block Z interposed between said wheel and the lower end of the latch X, and means for turning the shaft I and lifting the indicator K, substantially as described.

2. The combination of the vertical indicator shaft I, the vertically sliding indicator K mounted thereon and provided with the hub J having the grooved collar Q, the yoke-piece S provided with the pins R projecting through the vertical slots T in the guide plates U and fitting also in the groove in the collar Q, the latch X co-operating with one of the pins R, the trip lever B' co-operating with the lower end of the latch X, the reciprocating frame M provided with the trigger C' co-operating with the lever B', and with the inclined lifting plate V co-operating with one of the pins R, and means for reciprocating the frame M and turning the shaft I, substantially as described.

3. The combination of the horizontal rock-shaft C, the operating handle A fulcrumed thereon, the rack U' reciprocating at right angles to the shaft C, the gear W' fast upon the shaft and meshing with the rack, the frame R' reciprocating at right angles to the rack and provided with the diagonal slot S' receiving the pin T' upon the rack, the register-operating rack J', the adjustable guard P' moving with the frame R' beside the rack J', the reciprocating frame M actuated by the handle A, and the pawl O' carried by said frame and co-operating with the guard plate P' and rack J', substantially as described.

4. The combination of the horizontal rock-shaft C, the operating handle A fulcrumed thereon, the type-wheel B² geared to said shaft, a platen co-operating with said type-wheel, a spring for throwing the platen against the wheel, means actuated by the operating handle to retract the platen, a latch for holding it in retracted position, and a trip operated by the handle for tripping the latch and releasing the platen and permitting its spring to throw it against the wheel, substantially as described.

5. The combination of the type-wheel, the operating handle geared thereto, the platen co-operating with the wheel, the spring for throwing the platen against the wheel, the latch for holding the platen in retracted position, and the tripping and setting means operated by the handle to first trip the latch and permit the spring to throw the platen against the type wheel and to then reset the platen and re-engage it with the latch for the next operation, substantially as described.

6. The combination of the horizontal shaft C, the operating handle A fulcrumed thereon, the vertical shaft I geared to the shaft C, the type-wheel B², feed wheels G² and ratchets J² fast upon the shaft I, the feed wheels H² co-operating with the wheels G², the reciprocating frame M carrying the pawls I² co-operating with the ratchets J², and the platen co-operating with the type-wheel B² and actuated by the frame M, substantially as described.

7. The combination of the operating handle, the type wheel geared thereto and the platen actuated thereby and co-operating with the type wheel, the feeding devices for the paper strip, the fixed knife plate F³ and the movable knife frame H³ co-operating therewith and carrying the vertically adjustable plate K³, the reciprocating frame M actuated by the handle and co-operating with the plate K³, and means for lifting the plate K³ and temporarily maintaining it out of the path of the frame M³, substantially as described.

8. The combination, with the operating handle and the printing and feeding mechanisms actuated thereby, of the fixed knife plate F³, the movable frame H³ co-operating therewith, the vertically adjustable plate K³ carried by the frame H³, the bell-crank M³—M⁴—M⁵ connected to the plate K³, the operating link N³ connected to the arm M³ of the bell-crank, the detent lever R³ co-operating with the link N³, and the reciprocating frame M actuated by the operating handle and co-operating with the plate K³ and provided with a trip W³ co-operating with the detent lever R³, substantially as described.

9. The combination, with the horizontal rock-shaft C and the vertical indicator shaft I geared thereto and carrying the indicator K, of the operating handle A carried by the shaft C, the pointer E also carried by the shaft and co-operating with a dial F, and the spring-plunger E³ carried by the pointer E and co-operating with the recesses F³ in the plate G³, substantially as described.

10. The combination of the type-wheel, a spring actuated platen co-operating therewith, a latch for holding the platen in retracted position, an operating handle having two movements, one for setting the type wheel, and means actuated by the other movement of the handle to first trip the latch and release the platen and permit its spring to throw it against the type-wheel, and then retract the platen and re-engage it with the latch preparatory to the next operation, substantially as described.

LEO EHRLICH.

Witnesses:
W. PALMER CLARKSON,
EMIL J. BRANDT.